No. 666,525. Patented Jan. 22, 1901.
C. B. HOPKINS.
FOOD CUTTER.
(Application filed Sept. 20, 1899.)
(No Model.) 2 Sheets—Sheet 1.
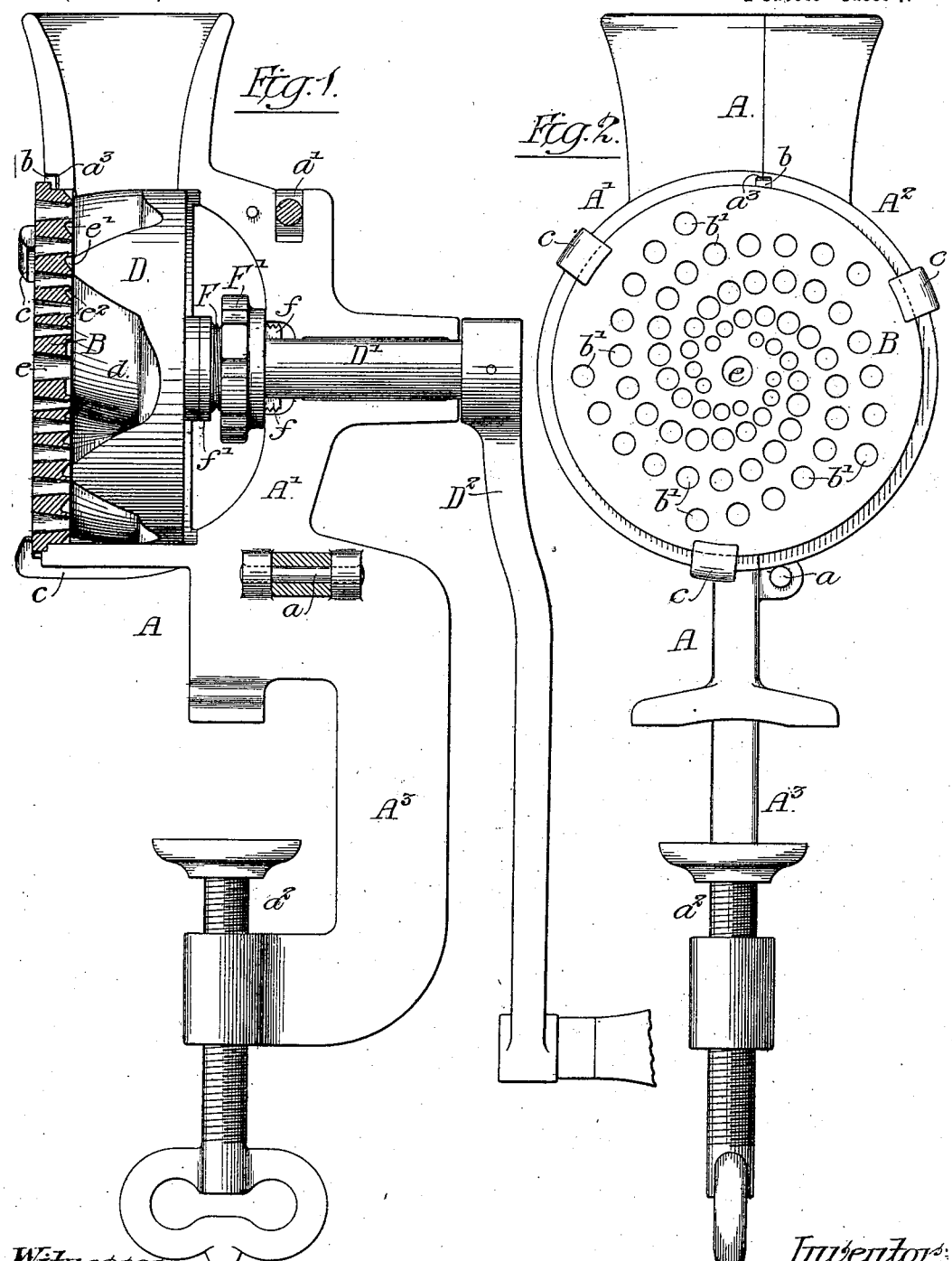

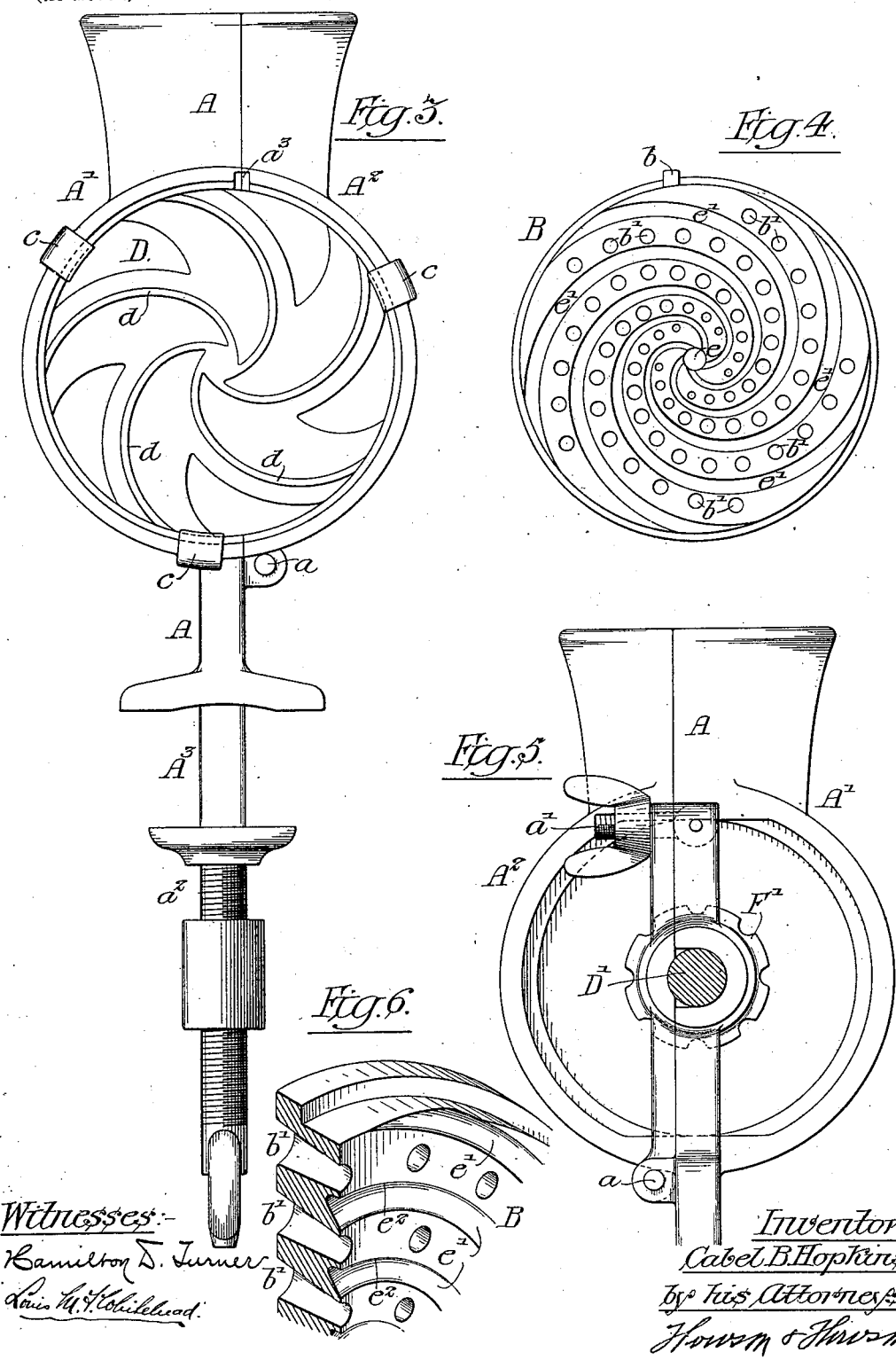

UNITED STATES PATENT OFFICE.

CABEL B. HOPKINS, OF PHILADELPHIA, PENNSYLVANIA, ASSIGNOR TO THE ENTERPRISE MANUFACTURING COMPANY OF PENNSYLVANIA, OF SAME PLACE.

FOOD-CUTTER.

SPECIFICATION forming part of Letters Patent No. 666,525, dated January 22, 1901.

Application filed September 20, 1899. Serial No. 731,087. (No model.)

*To all whom it may concern:*

Be it known that I, CABEL B. HOPKINS, a citizen of the United States, residing in Philadelphia, Pennsylvania, have invented certain Improvements in Food-Cutters, of which the following is a specification.

The object of my invention is to so construct a meat-cutter that it will readily separate the sinews from the meat and will cut the meat into small pieces, as fully described hereinafter, reference being had to the accompanying drawings, in which—

Figure 1 is a sectional elevation of my improved meat-cutter. Fig. 2 is a front view. Fig. 3 is a front view with the perforated plate removed. Fig. 4 is a view of the perforated plate removed. Fig. 5 is a rear view of the machine, and Fig. 6 is a sectional perspective view of a portion of the perforated plate.

Meat-cutters as heretofore made have been so designed as to cut the meat into small particles, the cutters severing the sinews as well as the meat portions; but it is desirable to separate the meat from the sinews, and this I do by the machine which I will now proceed to describe.

A is the frame of the machine, which may be of any design desired. The frame is preferably made in two sections A' and A². The section A² is pivoted to the section A' by a pin $a$ and is coupled at its upper end to the said fixed section by a pivoted bolt $a'$ and a thumb-screw, as clearly shown in Fig. 5. The frame A has an ordinary foot-section A³, provided with a clamp-screw $a^2$, by which it is attached to a table or other fixture. Other means of fastening the frame may be resorted to without departing from my invention.

B is a perforated plate adapted in the present instance to a recess formed in the flange of the sections A' A², and this plate has a pin $b$, adapted to a recess $a^3$ in the casing, whereby it is prevented from turning. Projecting from the casing are overlapping lugs $c$, which hold the plate in position. The plate has a series of perforations $b'$, preferably arranged in the form of a series of spirals, and between these perforations are a series of spiral grooves $e'$. These spiral grooves alternate with the perforations, as shown in Fig. 4, and the edge $e^2$ of the grooves is preferably abrupt. These grooves all communicate with the central passage or perforation $e$, and they are preferably tapered, being larger at the periphery of the plate than at the center.

D is a combined feed-screw and scraper and has a series of spirally-formed ribs $d$, and this feed-screw is backed off sufficiently from the surface of the plate B to allow the sinews to be worked in the grooves of the plate toward the central outlet-passage $e$. The spiral ribs on the feed-screw scrape the meat from the sinews, and the meat thus separated is forced through the perforations $b'$ in the plate and is finely divided by the action of the spiral ribs against the plate, the same as the ordinary perforated-plate food-cutter, but the meat passing through the perforations is free from sinews, and as the sinews pass out in a string through the central perforations they can be guided from the mass of cut meat falling from the perforated plate. The feed-screw D is provided with a shaft D', adapted to bearings in the two-part frame A, and has a handle D² at its outer end.

On the shaft D' of the feed-screw is an adjusting means consisting of a sleeve F, having lugs $f$ extending into cavities in the casing, and on this sleeve is a nut F', which bears against the casing, and between the sleeve F and the back of the feed-screw is a loose washer $f'$, so that on turning the nut F' the feed-screw can be moved toward or from the perforated plate B. Thus the exact adjustment required can be obtained so as to completely separate the sinews from the meat.

The casing is provided with a suitable hopper through which the meat is fed. The meat is preferably divided into strips and fed through the hopper into the body of the machine, and as the handle is turned the feed-screw will draw in the strips of meat and gradually feed them forward against the perforated plate, and as the pressure is exerted some particles of meat which are free from sinews will pass through the perforations in the plate, while other particles which cling to the sinews will be removed therefrom by the action of the edge of the grooves in the plate and the ribs of the feed-screw. This action tends to scrape the meat from the sinewy portions, and these portions will not be cut by the machine, as the feed-screw is so adjusted that there is sufficient allowance made for the clearance of the sinews. Consequently the sinews will accumulate in the grooves of the plate and by the action of the feed-screw will be fed toward the central opening and discharged therefrom in the form of a ropy mass. The particles of meat removed from the sinews will pass through the perforations in the plate and will be discharged in a finely-divided form.

I claim as my invention—

1. The combination in a food-cutter, of a casing, a plate at one end of the casing, means for feeding material toward the plate, said plate having a series of grooves therein and an outlet-opening communicating with the grooves, and having a series of perforations independent of the grooves, substantially as described.

2. The combination in a food-cutter, of the casing having a hopper, a perforated plate mounted in the casing and having a series of grooves, with perforations alternating with the grooves, the said grooves communicating with the central opening in the plate, a feed-screw having ribs, with means for adjusting the feed-screw in respect to the plate, substantially as described.

3. The combination in a food-cutter, of a casing made in two sections, one section being fixed and the other section pivoted to the fixed section, means for fastening the two sections together, a perforated plate secured to the casing, said perforated plate having a central outlet-passage, and a series of grooves communicating with the central passage, a feed-screw having a series of spiral ribs acting in conjunction with the grooves of the plate to separate the meat from the sinews, substantially as described.

4. The combination in a food-cutter, of a casing, a plate at one end of the casing, means for feeding material toward the plate, said plate having a central opening, a series of spirally-arranged grooves communicating with the central opening and tapered from the periphery to the center of the plate and having a shoulder at one side, and having a series of perforations alternating with the grooves, substantially as described.

In testimony whereof I have signed my name to this specification in the presence of two subscribing witnesses.

CABEL B. HOPKINS.

Witnesses:
 WILL. A. BARR,
 JOS. H. KLEIN.